(12) United States Patent
Kennair, Jr.

(10) Patent No.: US 10,121,390 B2
(45) Date of Patent: Nov. 6, 2018

(54) HELMET POINT-OF-VIEW TRAINING AND MONITORING METHOD AND APPARATUS

(71) Applicant: Donald Kennair, Jr., Belle Chasse, LA (US)

(72) Inventor: Donald Kennair, Jr., Belle Chasse, LA (US)

( * ) Notice: Subject to any disclaimer, the term of this patent is extended or adjusted under 35 U.S.C. 154(b) by 349 days.

(21) Appl. No.: 14/939,142

(22) Filed: Nov. 12, 2015

(65) Prior Publication Data

US 2017/0140666 A1  May 18, 2017

(51) Int. Cl.
| | |
|---|---|
| *G09B 19/16* | (2006.01) |
| *H04N 5/225* | (2006.01) |
| *H04N 5/91* | (2006.01) |
| *H04N 7/18* | (2006.01) |
| *G03B 17/56* | (2006.01) |
| *F16M 13/04* | (2006.01) |
| *G09B 9/05* | (2006.01) |
| *G09B 9/06* | (2006.01) |

(Continued)

(52) U.S. Cl.
CPC ............ *G09B 19/16* (2013.01); *F16M 13/04* (2013.01); *G03B 17/561* (2013.01); *G03B 17/566* (2013.01); *G09B 9/05* (2013.01); *G09B 9/063* (2013.01); *G09B 9/307* (2013.01); *G09B 19/162* (2013.01); *G09B 19/165* (2013.01); *G09B 19/167* (2013.01); *H04N 5/2253* (2013.01); *H04N 5/2257* (2013.01); *H04N 5/77* (2013.01); *H04N 5/91* (2013.01); *H04N 7/185* (2013.01); *A42B 3/04* (2013.01); *F16M 11/041* (2013.01); *F16M 11/10* (2013.01)

(58) Field of Classification Search
CPC .... G09B 19/16; G09B 19/162; G09B 19/167; G09B 9/05; G09B 9/063; G09B 9/307; G09B 19/165; F16M 13/04; F16M 11/10; F16M 11/041; H04N 5/185; H04N 5/2253; H04N 5/2257; H04N 5/77; H04N 5/91; A42B 3/04; G03B 17/561; G03B 17/566
See application file for complete search history.

(56) References Cited

U.S. PATENT DOCUMENTS

| | | | |
|---|---|---|---|
| 4,398,799 A | 8/1983 | Swift | |
| 4,449,787 A * | 5/1984 | Burbo | ................... A42B 3/042 313/524 |

(Continued)

FOREIGN PATENT DOCUMENTS

| | | |
|---|---|---|
| EP | 0654776 | 5/1995 |
| KR | 1020130052130 | 5/2013 |

*Primary Examiner* — Timothy A Musselman
(74) *Attorney, Agent, or Firm* — Keaty Law Firm, LLC (57) ABSTRACT

A helmet point-of-view training and monitoring method and apparatus to solve problems encountered in the training and monitoring of pilots of airplanes and other air, sea, land, and space vessels, or vehicles where the seating arrangement in the cockpit prevents an instructor or evaluator from sitting beside or directly observing the pilot's view of the controls and indicators in the cockpit and the outside view from the pilot's position in the cockpit, by providing an apparatus to affix a camera to the standard multi-angle mounting surface found on pilot's helmets, in a proper position and at a proper angle, and by capturing a series of images from the pilot's point of view and displaying such images in real time to an instructor and as recordings for review by pilots, instructors, and others.

20 Claims, 8 Drawing Sheets

(51) Int. Cl.
*G09B 9/30* (2006.01)
*H04N 5/77* (2006.01)
*A42B 3/04* (2006.01)
*F16M 11/04* (2006.01)
*F16M 11/10* (2006.01)

(56) References Cited

U.S. PATENT DOCUMENTS

| | | | |
|---|---|---|---|
| 4,907,296 | A | 3/1990 | Blecha |
| 4,922,550 | A * | 5/1990 | Verona .................... A42B 3/228 |
| | | | 2/424 |
| 8,739,313 | B2 | 6/2014 | Teetzel |
| 8,786,680 | B2 | 7/2014 | Shiratori et al. |
| 9,615,067 | B1 * | 4/2017 | Foote ....................... H04N 7/185 |
| 2010/0128135 | A1 * | 5/2010 | Filipovich ............. G02B 23/125 |
| | | | 348/217.1 |
| 2010/0146684 | A1 | 6/2010 | Rivas et al. |
| 2011/0183301 | A1 | 7/2011 | Turner |
| 2012/0047765 | A1 | 3/2012 | Kolesar |
| 2015/0097980 | A1 | 4/2015 | Cucci et al. |
| 2015/0145990 | A1 | 5/2015 | Jones |

* cited by examiner

HELMET POINT-OF-VIEW TRAINING AND MONITORING METHOD AND APPARATUS

BACKGROUND OF THE INVENTION

This invention provides a helmet point-of-view training and monitoring method and apparatus that solves problems encountered in the training and monitoring of pilots of airplanes and other air, sea, land, and space vessels, or vehicles where the seating arrangement in the cockpit prevents an instructor or evaluator from sitting beside or directly observing the pilot's view of the controls and indicators in the cockpit, and the outside view from the pilot's position in the cockpit.

Piloting an air, sea, land, space vessel, or vehicle is an acquired skill that requires training. The training, when performed correctly, involves both the pilot's and the instructor's seeing and interpreting a great deal of subtle nuance of direction of attention, anticipation of events, and adjustments and responses. While some vessels or vehicles provide flight decks or pilot houses that allow a pilot in training and an instructor to sit or stand side by side and communicate using normal conversation and an essentially shared point of view, other vessels or vehicles have no room at all for an instructor, or require the instructor to sit behind or otherwise apart from the pilot, with the pilot and the equipment blocking any possibility of a shared point of view. For example, in a fighter jet type of airplane, the pilot sits alone in a crowded cockpit, strapped into a bulky ejection seat, and if there is any room at all for an instructor, such a seat is behind the pilot and the instructor has no shared point of view with the pilot. The same problem is encountered with other vessels and vehicles, and with any vessel or vehicle that is designed to accommodate only one person. Because the instructor cannot observe the nuances of the pilot's attention and actions, and vice-versa, the training of pilots under those conditions is affected negatively.

Flying or operating many of these vessels or vehicles is expensive, and so in-flight training is also expensive. There is a need to be able to "replay" and review training flights for the benefit of both the pilot and the instructor, in order to observe nuances that might have been overlooked during the actual flight. There is also a benefit to be gained by other pilots-in-training and by other instructors being able to review training flights.

Pilots wear flight helmets that are very expensive and are specifically fit and configured for an individual pilot. It would be cost-prohibitive to provide separate training helmets in order to implement any solution to convey the pilot's point of view to the instructor. Typical flight helmets have one or more visors that can be lifted out of the way under a visor shield mounted under the top front portion of the helmet. The typical helmet visor shield has an incorporated mount for a night vision device (NVD), which is often referred to colloquially as an "ANVIS mount." The NVD-ANVIS mount is a military standard. The NVD-ANVIS mount has two angular bends, creating three different faces, with holes and slots to accommodate mounting studs on the night vision device or NVD. The NVD-ANVIS mount is fixed to the visor shield of the helmet so that a night vision device will be placed and held in a defined and fixed relationship to the helmet-wearer's face and eyes.

Standard, available camera mounts will not properly mount directly to the NVD-ANVIS mount. Standard camera mounts are designed to hold the "film plane" of a camera in relation to a single plane of, for instance, a tripod mount, bayonet mount, parachute-buckle mount, or Picatinny-rail mount, but not to the three different planes of the NVD-ANVIS mount. Therefore, an impediment to using available cameras in order to capture images from substantially the point of view of a pilot wearing a flight helmet is the lack of an apparatus to provide a single plane for camera mounting properly positioned in relation to a pilot's point of view.

There is thus a need for a method of capturing a stream of images from essentially a pilot's point of view and displaying those images in real time to an instructor and as recordings for review by pilots, instructors, and others, and an apparatus to allow the proper positioning of a camera for use in such a method.

SUMMARY OF THE INVENTION

The present invention provides a helmet point-of-view training and monitoring method, providing an apparatus to affix a camera to the standard multi-angle mounting surface found on pilot's helmets in a proper position and at a proper angle, and for capturing a series of images from the pilot's point of view and displaying such images in real time to an instructor and as recordings for review by pilots, instructors, and others.

The present invention solves existing problems encountered in the training and monitoring of pilots of airplanes and other air, sea, land, and space vessels, or vehicles where the seating arrangement in the cockpit prevents an instructor or evaluator from sitting beside or directly observing the pilot's view of the controls and indicators in the cockpit and the outside view from the pilot's position in the cockpit.

BRIEF DESCRIPTION OF DRAWINGS

Reference will now be made to the drawings, wherein like parts are designated by like numerals, and wherein.

DETAILED DESCRIPTION OF THE INVENTION

Figure 1:
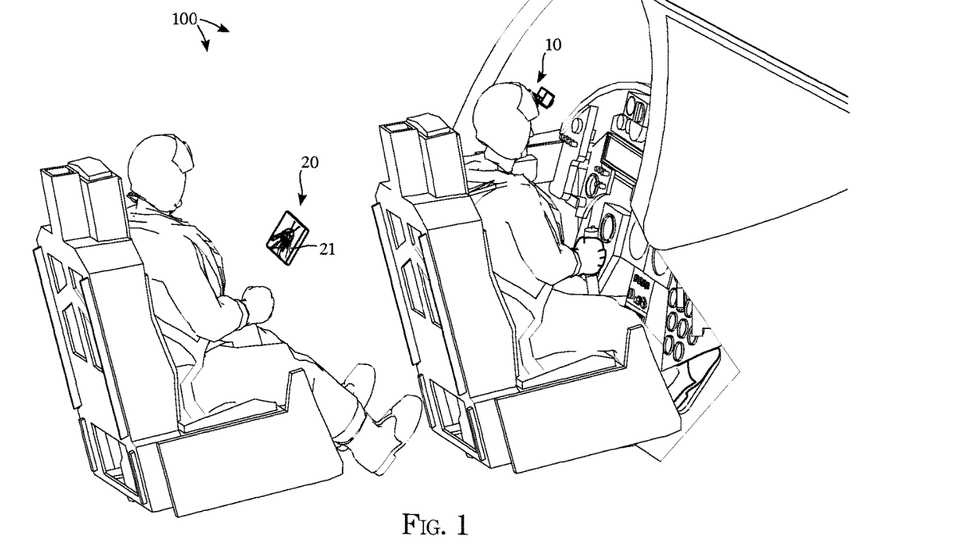
FIG. 1 is a schematic view of the helmet point-of-view training and monitoring method and apparatus in use in an airplane.
Figure 2:
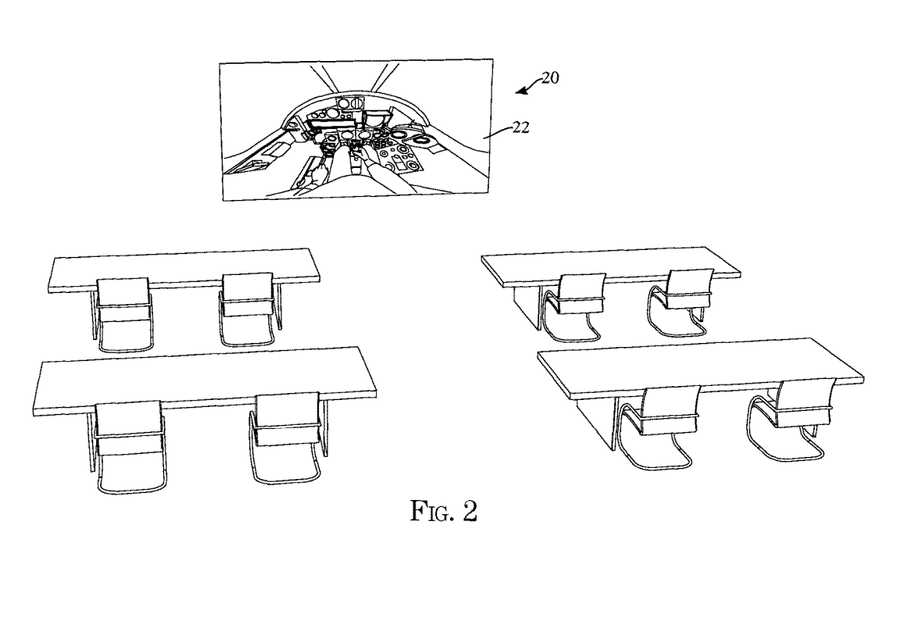
FIG. 2 is a schematic view of the helmet point-of-view training and monitoring method in use in a briefing room.

Referring to FIG. 1 & FIG. 2, the helmet point-of-view training and monitoring method 100 is shown schematically. Where the instructor or evaluator must sit behind the pilot, with a bulky ejection seat and other obstructions blocking views of the pilot and views corresponding to the pilot's point of view, a helmet point-of-view training and monitoring apparatus 10 allows the attachment of a suitable camera to the standard NVD-ANVIS mount of the pilot's helmet's visor cover, with the camera aimed at a proper angle in a proper direction to provide a view closely corresponding to the pilot's point of view. It may be noted that while FIG. 1 depicts the interior of a typical airplane, the instant invention may be implemented and utilized in multiple types of aircrafts, such as helicopters and military aircrafts, which may feature an interior arrangement different from that of depicted in FIG. 1. The image produced by the camera is displayed on a suitable display device 20. For an instructor flying with a pilot, a suitable display device 20 is a small portable video display 21, and the stream of images from the pilot's point of view is viewed by the instructor in real time. For later analysis or review of the images from the pilot's point of view, which might be done by the instructor, by the pilot, or by other parties, a suitable display device is a large video display 22, and the stream of images are replayed from a recording. For an instructor not flying with a pilot, real-time display of the stream of images from the pilot's point of view can be effected by transmission of the stream of images to the instructor's position in another vessel or vehicle or on the ground, giving the remote instructor an essentially concurrent view of the pilot's view, and allowing immediate feedback, instruction, or correction.

Used in real time, the stream of images from the pilot's point of view provided by this invention allow for more effective instruction and more immediate feedback, whether the instructor is in the same vessel as the pilot, in an accompanying vessel, or on the ground. Used as a recording, the stream of images from the pilot's point of view provided by this invention allow for continued revue of the events of the expensive flight time in less expensive and less intense circumstances on the ground, where the pilot, the instructor, and possibly other pilots and instructors, can review the flight from the pilot's point of view.

Beyond the training of new pilots, this invention provides for ongoing monitoring of pilots' flights for review or refresher training or evaluation, or, in the event of any incident, provides for a recorded stream of images from the pilot's point of view for analysis of such an incident.

The helmet point-of-view training and monitoring method and apparatus can also be used on the helmet of, and to show the point of view of, an instructor, to be viewed in real time or as a recording by trainee pilots.

Figure 3:
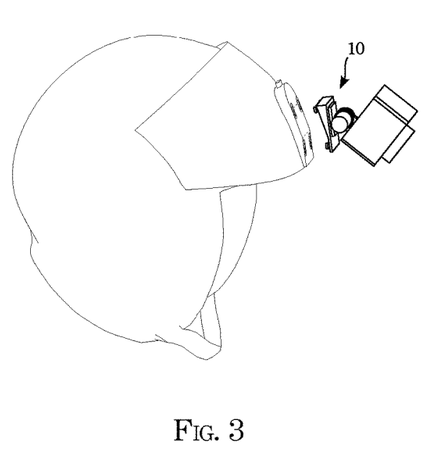
FIG. 3 is an orthographic view of the helmet point-of-view training and monitoring apparatus before attachment to a standard pilot's helmet.
Figure 4:
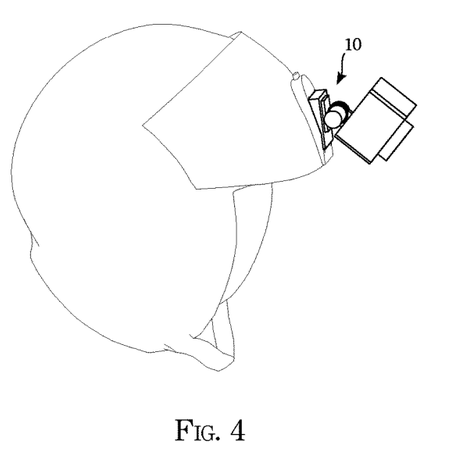
FIG. 4 is an orthographic view of the helmet point-of-view training and monitoring apparatus attached to a standard pilot's helmet.

Referring to FIG. 3 & FIG. 4, the helmet point-of-view training and monitoring apparatus 10 provides for the removable attachment of a camera to the standard NVD-ANVIS mount found on the visor cover of flight helmets, such that the camera is attached at the proper position and angle relative to the pilot's point of view.

Figure 5:
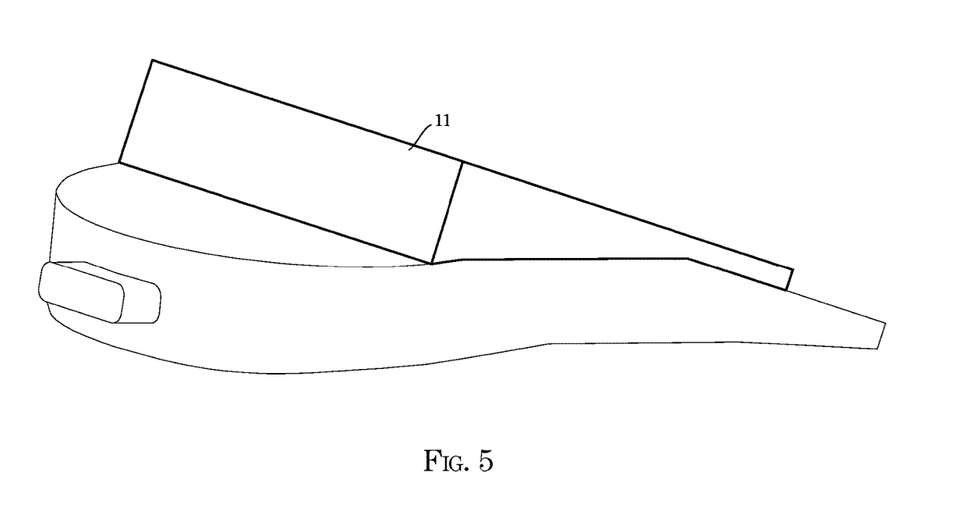
FIG. 5 is an orthographic view of the intermediate mating structure of the helmet point-of-view training and monitoring apparatus attached to a standard NVD-ANVIS mount.

Referring to FIG. 5, the intermediate mating structure 11 component of the apparatus removably attaches to the three different-angled faces of the standard NVD-ANVIS mount, and provides a single planar face matching the face of the NVD-ANVIS mount which is, in turn, essentially co-planar with the point of view of the pilot wearing the flight helmet.

Figure 6:
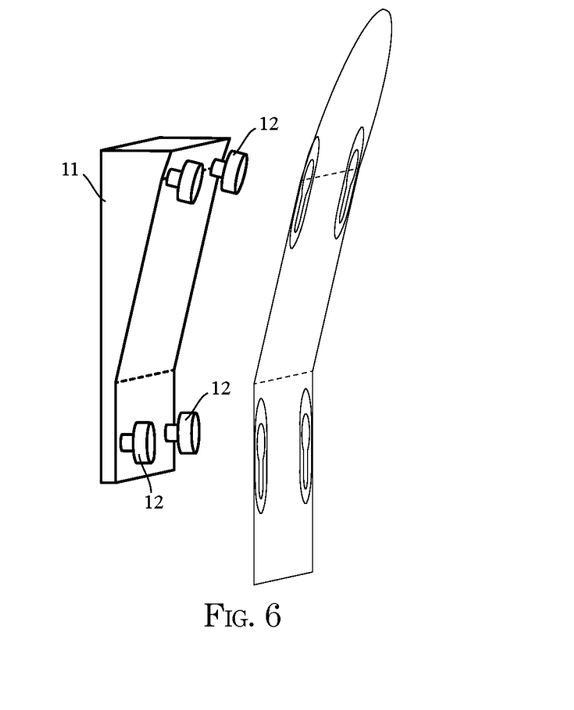
FIG. 6 is an orthographic view of the intermediate mating structure of the helmet point-of-view training and monitoring apparatus before attachment to a standard NVD-ANVIS mount.

Referring to FIG. 6, the intermediate mating structure 11 has mounting studs 12 adapted to mate with and fit the holes and slots of a standard NVD-ANVIS mount, which are spread across the three different-angled faces of the NVD-ANVIS mount. The mounting studs 12 are arrayed with two nominally lower studs located 0.625 inches below the line of the angle break between the nominally lower sub-face and the nominally middle sub-face, with two nominally upper studs located 0.75 inches above the same angle-break line, with 1.1 inches nominally horizontal distance between studs, and with the upper studs vertically above the lower studs. The single planar face is parallel to a nominally lower sub-face of said multi-angle face.

Figure 7:
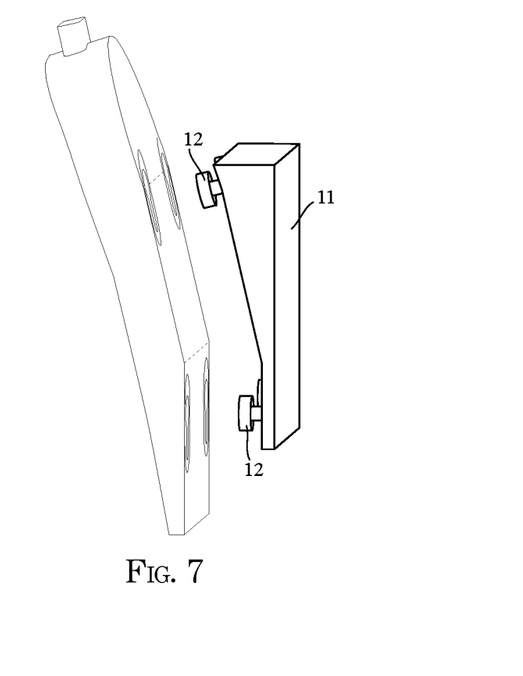
FIG. 7 is an orthographic view of the intermediate mating structure of the helmet point-of-view training and monitoring apparatus before attachment to a standard NVD-ANVIS mount.
Figure 8:
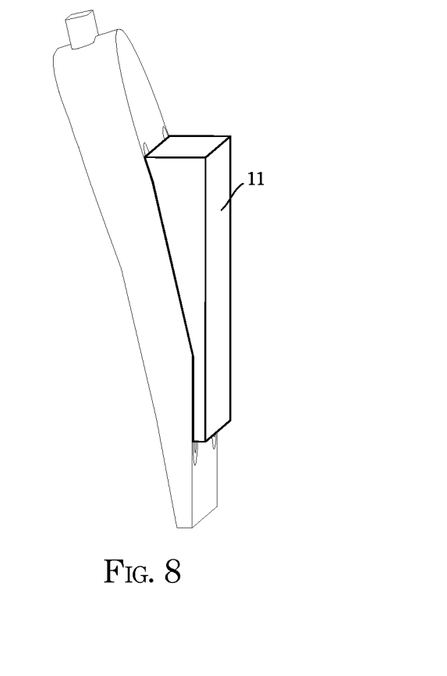
FIG. 8 is an orthographic view of the intermediate mating structure of the helmet point-of-view training and monitoring apparatus attached to a standard NVD-ANVIS mount.

Referring to FIG. 7 & FIG. 8, showing the standard helmet mount in its essentially vertical orientation in use, the intermediate mating structure 11 is removably attached to the standard NVD-ANVIS mount by the mounting studs 12, matching the three different-angled faces and providing a single planar face which is essentially co-planar with the pilot's point of view when wearing the helmet.

Figure 9:
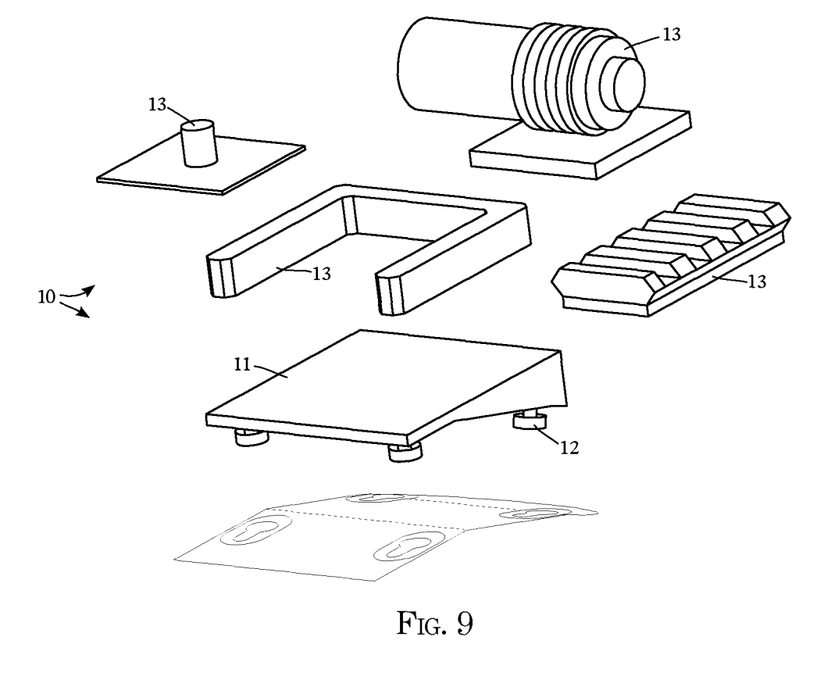
FIG. 9 is a schematic view of the intermediate mating structure and embodiments of camera-specific mounting structures of the helmet point-of-view training and monitoring apparatus.

Referring to FIG. 9, in order to complete the helmet point-of-view training and monitoring apparatus 10, a suitable camera-specific mounting structure 13 is attached to the single planar face of the intermediate mating structure 11. Such camera-specific mounting structures include, without limitation, standard "tripod" mounts, "buckle" receptacles similar to parachute buckles, concentric-ring rotating mounts, bayonet mounts, and Picatinny-rail or tactical-rail mounts.

Figure 10:
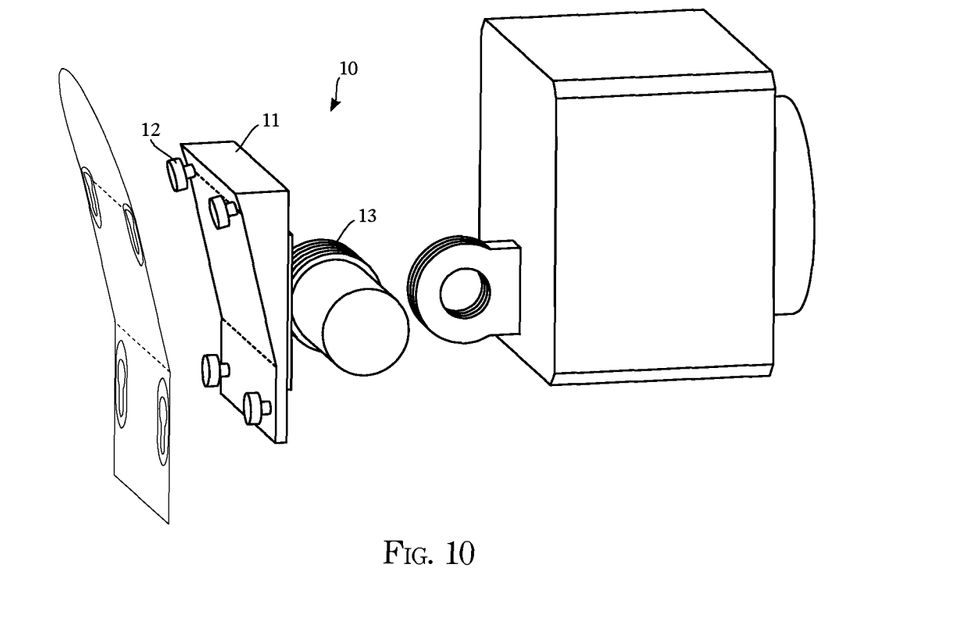
FIG. 10 is an exploded orthographic view of an embodiment of the helmet point-of-view training and monitoring apparatus in use.
Figure 11:
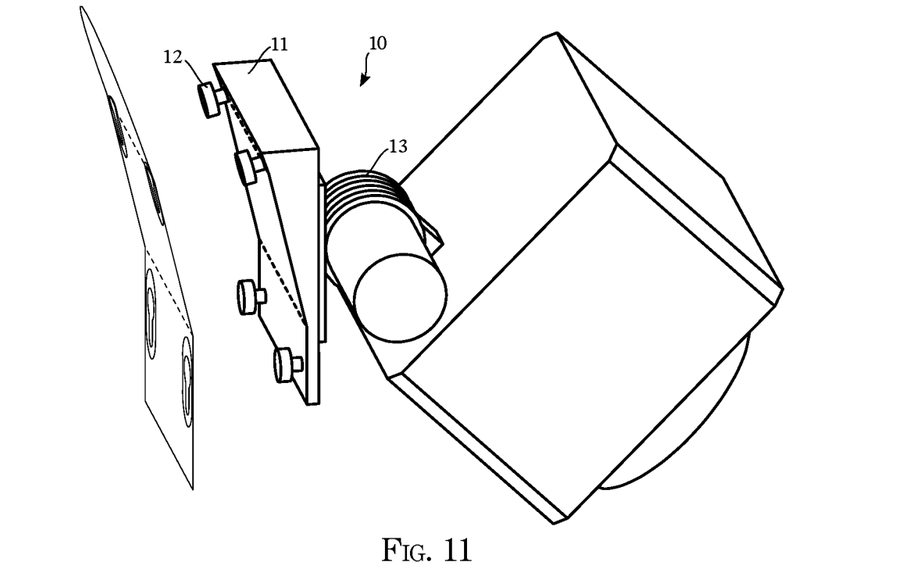
FIG. 11 is an orthographic view of an embodiment of the helmet point-of-view training and monitoring apparatus in use.

Referring to FIG. 10 & FIG. 11, in an embodiment using a concentric-ring rotating camera-specific mounting structure 13, the intermediate mating structure 11 of the helmet point-of-view training and monitoring apparatus 10 is removably attached and matched to the three different-angled faces of the standard NVD-ANVIS mount by the mounting studs 12, providing a single planar face to which is attached the camera-specific mounting structure 13 and, in turn, a camera, at the proper position and angle to capture images closely matching the pilot's point of view. In a functioning prototype, a small, lightweight camera having a moderately wide-angle fixed lens, corresponding to a 35 mm focal-length lens on a 35 mm film-sized camera, mounted at a downward angle of approximately 45 degrees, provided suitable coverage of the pilot's point of view in the cockpit.

Figure 12:
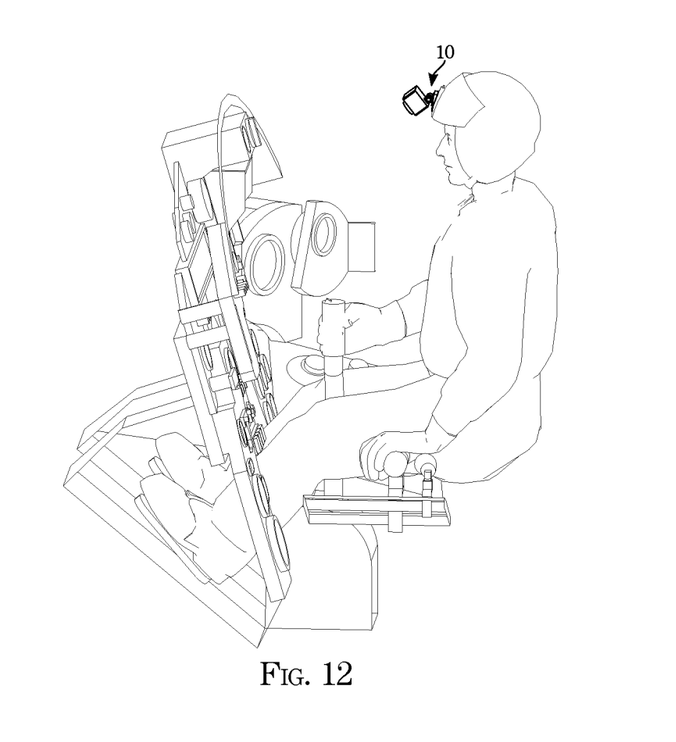
FIG. 12 is a side partial cutaway view of the helmet point-of-view training and monitoring method and apparatus in use with a forward-facing pilot.
Figure 13:
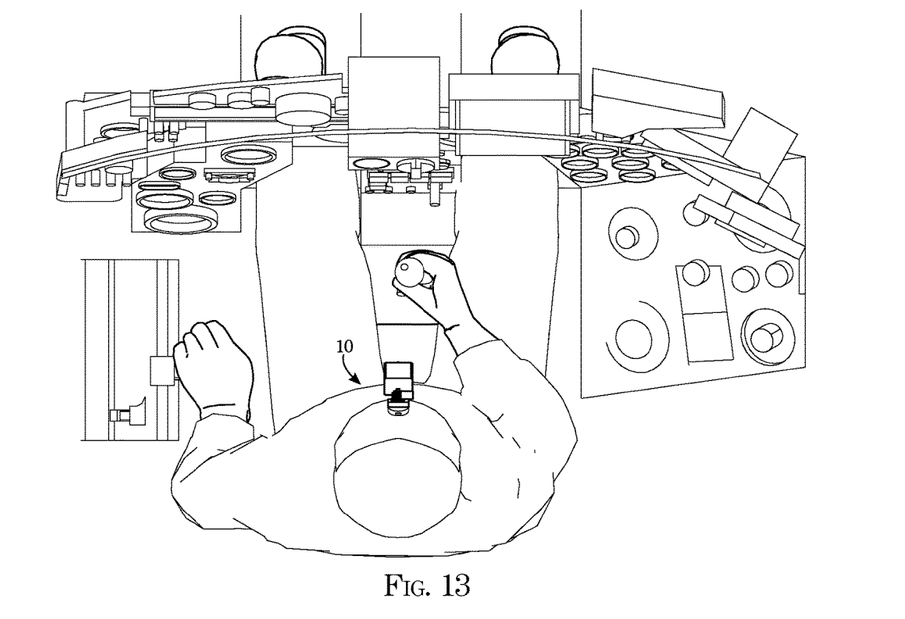
FIG. 13 is a top partial cutaway view of the helmet point-of-view training and monitoring method and apparatus in use with a forward-facing pilot.
Figure 14:
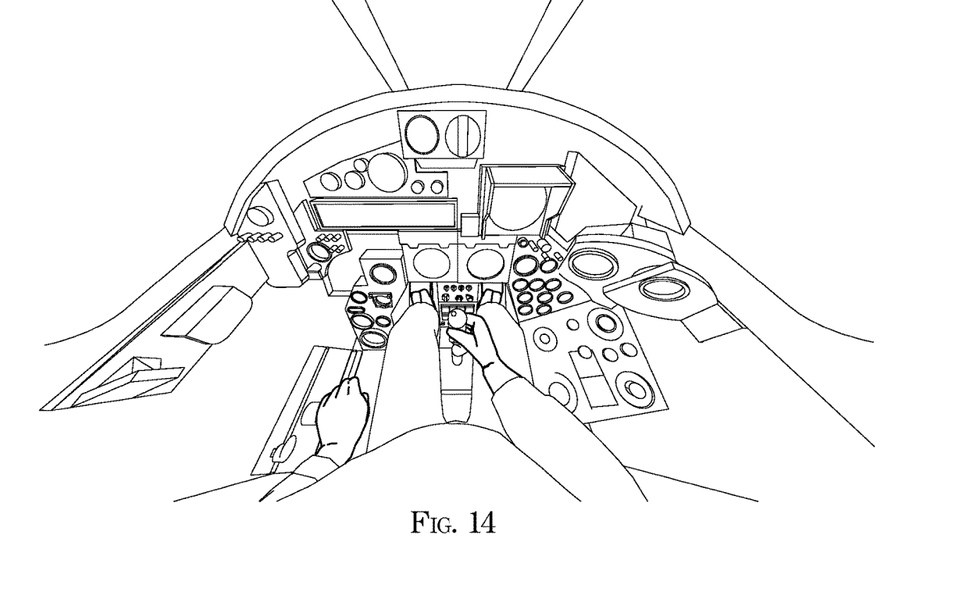
FIG. 14 is a representation of the perspective view captured by the helmet point-of-view training and monitoring method and apparatus in use with a forward-facing pilot.

Referring to FIG. 12, FIG. 13, & FIG. 14, representing the invention in use by a pilot facing front, and the resulting image, among the many important points of information for the pilot and for the pilot's instructor are the positions and movements of the pilot's hands and feet in operating the yoke or joystick, the throttle, and the pedals, the indications and possible warnings given by the instrument displays, and the view out of the windshield. With the prototype arrangement described above, with a moderately wide-angle lens and an approximately 45-degree downward tilt, the resulting image includes all of the important points of information, including both hands and both feet, the instrument displays, and a view out of the lower and middle portions of the windshield.

Figure 15:
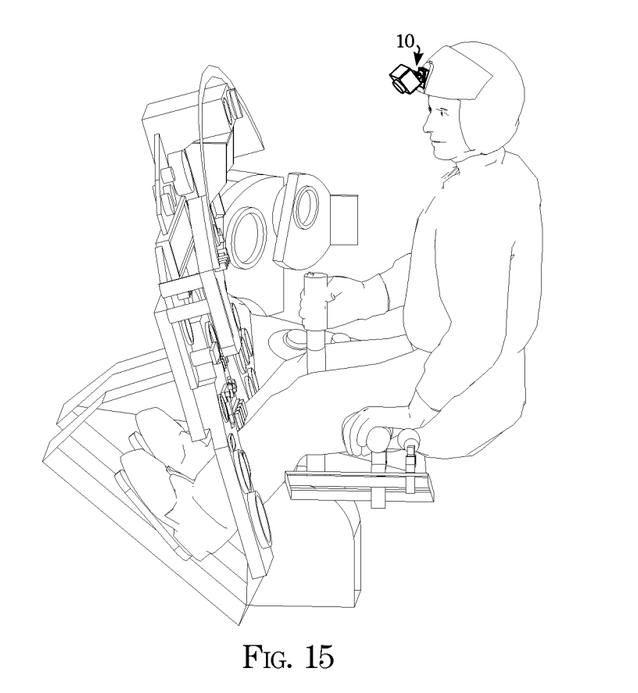
FIG. 15 is a side partial cutaway view of the helmet point-of-view training and monitoring method and apparatus in use with a leftward-facing pilot.
Figure 16:
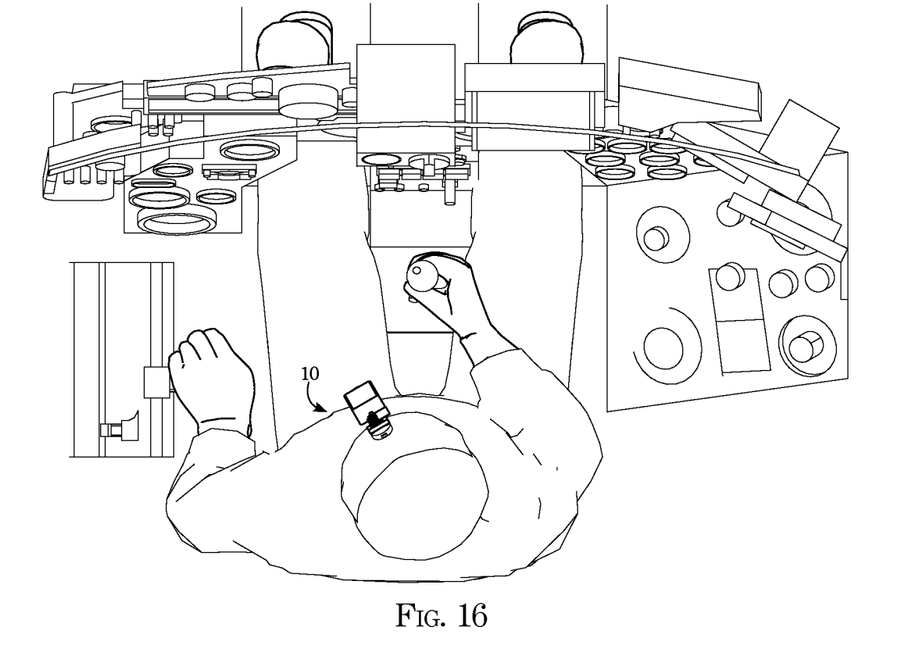
FIG. 16 is a top partial cutaway view of the helmet point-of-view training and monitoring method and apparatus in use with a leftward-facing pilot.
Figure 17:
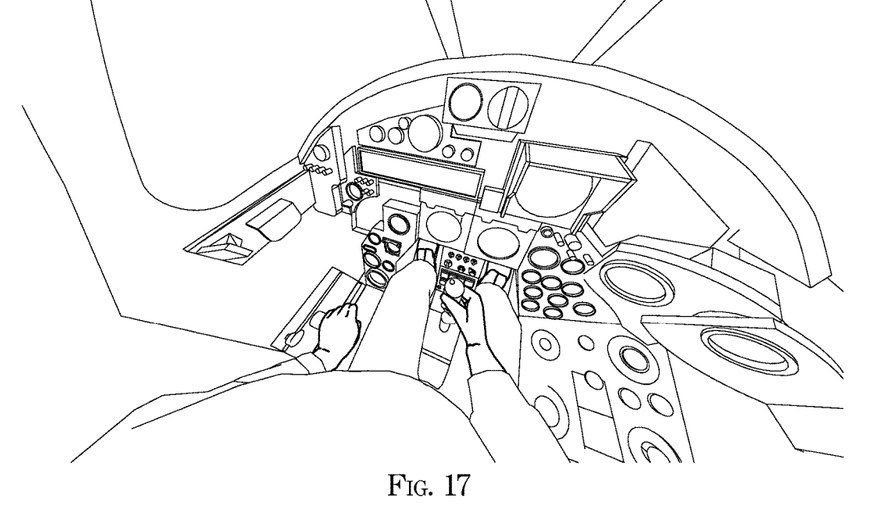
FIG. 17 is a representation of the perspective view captured by the helmet point-of-view training and monitoring method and apparatus in use with a leftward-facing pilot.
Figure 18:
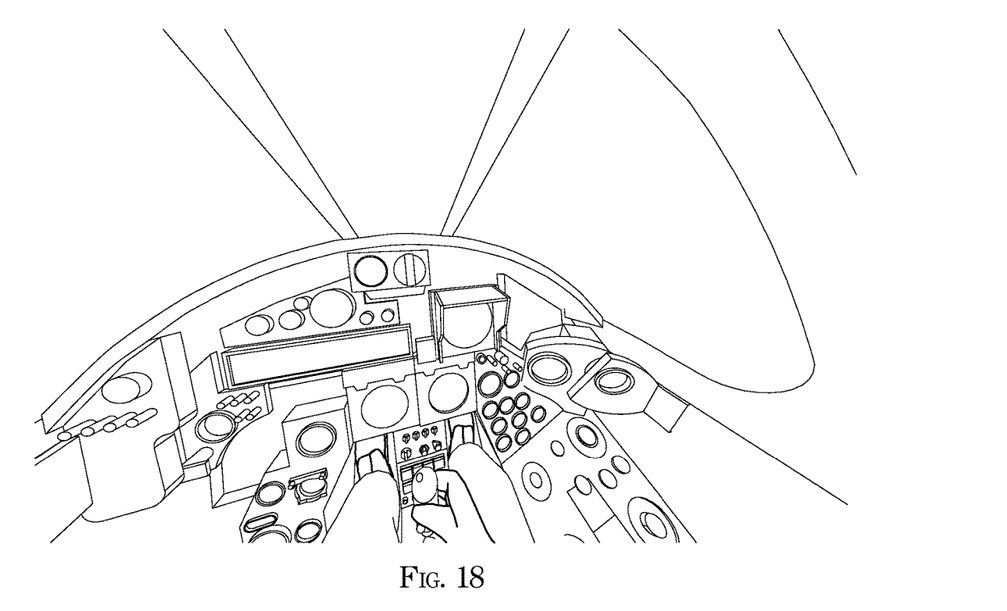
FIG. 18 is a representation of the perspective view captured by the helmet point-of-view training and monitoring method and apparatus in use with a rightward-facing pilot.

Referring to FIG. 15, FIG. 16, & FIG. 17, representing the invention in use by a pilot facing leftward, and the resulting image, and to FIG. 18, representing the image resulting from a pilot facing rightward and upward, the image provided by the invention gives a general indication of where a pilot is looking, because the limitations on peripheral sight imposed by the helmet require some movement of the head, and therefore of the camera.

In addition to the value of the recorded stream of images from the pilot's point of view for instruction or review of a specific flight, the recorded images will be valuable in assessing the progress of any specific pilot in training, and of assessing the performance of multiple pilots in the aggregate, allowing the identification and analysis of common and uncommon occurrences and reactions. Also, in the event of an unusual occurrence, the recorded stream of images from the pilot's point of view will likely be valuable in analyzing such an unusual occurrence.

Many changes and modifications can be made in the present invention without departing from the spirit thereof. I therefore pray that my rights to the present invention be limited only by the scope of the appended claims.

I claim:

1. A helmet point-of-view training and monitoring method for a pilot wearing a helmet having a standard NVD-ANVIS mount, comprising:
   (i) providing a helmet point-of-view training and monitoring apparatus, comprising: an intermediate mating structure, comprising:
      (a) a multi-angled face adapted to mate with different-angled faces of the standard NVD-ANVIS mount;
      (b) a plurality of mounting studs arrayed on said multi-angled face and adapted to fit the holes and slots of the standard NVD-ANVIS mount;
      (c) a single planar face extending opposite the multi-angled face and adapted to be oriented essentially co-planar with the pilot's point of view when wearing the helmet; and
      (d) a camera-specific mounting structure attached to said single planar face of said intermediate mating structure, adapted to mount a camera to said intermediate mating structure at a determined position and angle to said single planar face;
   where said intermediate mating structure with said camera-specific mounting structure attached is adapted to be removably attached and mated with the different-angled faces of the standard NVD-ANVIS mount, placing the camera at a pre-determined position and angle relative to the standard NVD-ANVIS mount, and in turn relative to the point of view of a pilot wearing a helmet having the standard NVD-ANVIS mount;
   (ii) mounting a camera on said helmet point-of-view training and monitoring apparatus;
   (iii) capturing a series of images from the pilot's point of view during flight; and
   (iv) displaying said captured series of images on a display device.

2. The helmet point-of-view training and monitoring method of claim 1, further comprising said displaying of said captured series of images on a display device in real time.

3. The helmet point-of-view training and monitoring method of claim 1, further comprising said displaying of said captured series of images on a display device in real time to an instructor.

4. The helmet point-of-view training and monitoring method of claim 1, further comprising said displaying of said captured series of images on a display device as a recording.

5. The helmet point-of-view training and monitoring method of claim 1, where said display device further comprises a small portable video display.

6. The helmet point-of-view training and monitoring method of claim 1, where said display device further comprises a large video display.

7. The helmet point-of-view training and monitoring method of claim 1, where said camera has a moderate wide angle of view approximately corresponding to the angle of view of a 35 mm lens on a 35 mm camera.

8. The helmet point-of-view training and monitoring method of claim 1, where said camera is mounted at approximately 45 degrees downward from said single planar face.

9. The helmet point-of-view training and monitoring method of claim 1, where said displaying of said captured series of images on a display device is used by an instructor for the purpose of training the pilot.

10. The helmet point-of-view training and monitoring method of claim 1, where said displaying of said captured series of images on a display device is used by a pilot for the purpose of review.

11. The helmet point-of-view training and monitoring method of claim 1, where said displaying of said captured series of images on a display device is used in order to monitor the pilot and derive information relevant to specific flights and to multiple flights in the aggregate.

12. A helmet point-of-view training and monitoring apparatus for a pilot wearing a helmet having a standard NVD-ANVIS mount, the helmet point-of-view training and monitoring apparatus comprising:
   (i) an intermediate mating structure, comprising:
      (a) a multi-angled face adapted to mate with different-angled faces of the standard NVD-ANVIS mount;
      (b) a plurality of mounting studs arrayed on said multi-angled face and adapted to fit the holes and slots of the standard NVD-ANVIS mount; and
      (c) a single planar face extending opposite the multi-angled face and adapted to be oriented essentially co-planar with the pilot's point of view when wearing the helmet; and
   (ii) a camera-specific mounting structure attached to said single planar face of said intermediate mating structure, adapted to mount a camera to said intermediate mating structure at a determined position and angle to said single planar face;

where said intermediate mating structure with said camera-specific mounting structure attached is adapted to be removably attached and mated with the different-angled faces of the standard NVD-ANVIS mount, placing the camera at a pre-determined position and angle relative to the standard NVD-ANVIS mount, and in turn relative to the point of view of a pilot wearing a helmet having the standard NVD-ANVIS mount.

13. The helmet point-of-view training and monitoring apparatus of claim 12, where said multi-angled face further comprises a nominally lower sub-face and a nominally middle sub-face having an angle of 14 degrees.

14. The helmet point-of-view training and monitoring apparatus of claim 12, where said mounting studs are arrayed with two nominally lower studs located 0.625 inches below the line of the angle break between the nominally lower sub-face and the nominally middle sub-face, with two nominally upper studs located 0.75 inches above the same angle-break line, with 1.1 inches nominally horizontal distance between studs, and with the upper studs vertically above the lower studs.

15. The helmet point-of-view training and monitoring apparatus of claim 12, where said single planar face is parallel to a nominally lower sub-face of said multi-angle face.

16. The helmet point-of-view training and monitoring apparatus of claim 12, where said camera-specific mounting structure further comprises a standard tripod mount.

17. The helmet point-of-view training and monitoring apparatus of claim 12, where said camera-specific mounting structure further comprises a bayonet mount.

18. The helmet point-of-view training and monitoring apparatus of claim 12, where said camera-specific mounting structure further comprises a buckle mount.

19. The helmet point-of-view training and monitoring apparatus of claim 12, where said camera-specific mounting structure further comprises a concentric-circle rotating mount.

20. The helmet point-of-view training and monitoring apparatus of claim 12, where said camera-specific mounting structure further comprises a standard Picatinny-rail or tactical-rail mount.

* * * * *